March 29, 1932. O. H. WILLIAMS 1,851,940
CLOSURE FOR CONDUITS AND THE LIKE
Filed Nov. 13, 1929
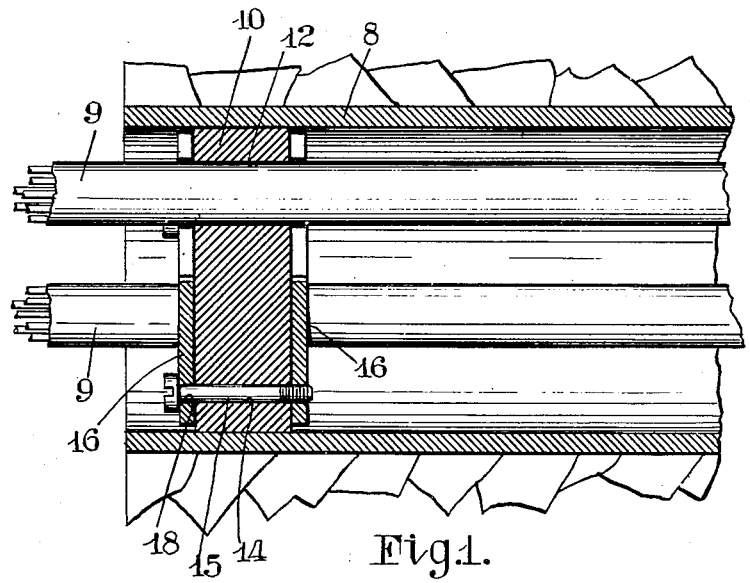
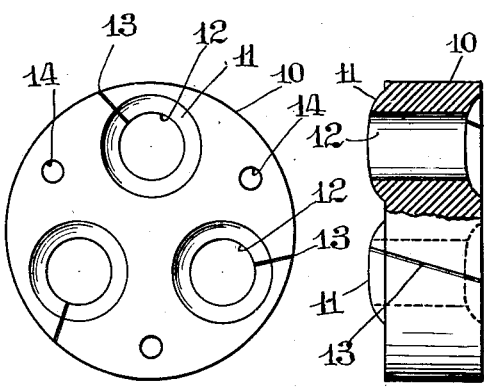
Fig.2. Fig.3. Fig.4. Fig.5.
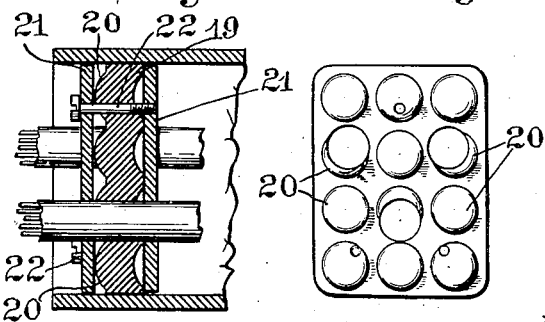
Fig.6. Fig.7.
Inventor
ORR H. WILLIAMS
Finckel & Finckel
his Attorneys Patented Mar. 29, 1932

1,851,940

UNITED STATES PATENT OFFICE

ORR H. WILLIAMS, OF COLUMBUS, OHIO

CLOSURE FOR CONDUITS AND THE LIKE

Application filed November 13, 1929. Serial No. 406,953.

Conduits for leading electric conductors into houses, buildings and other structures frequently constitute the means for conveying explosive or noxious gas into such structures thereby endangering the health, lives and limbs of the occupants or persons entering them. Means have been proposed for plugging such conduits to prevent the passage of gases with a septum provided with holes for the electric conductors.

The primary object of the present invention is to provide an improved form of septum whereby it may be made as one piece molded or otherwise produced thereby reducing the cost of manufacture, simplifying the installation and therefore reducing the expense thereof. The invention can be utilized at any point in a conduit where it is desirable to arrest or prevent the flow of any fluid from the conduit or from one point to another therein. Other objects will appear from the disclosure herein.

The invention is embodied in the example herein shown and described the features of novelty being finally claimed.

In the accompanying drawings—

Figure 1 is a longitudinal section of the terminal of a cable conduit with the invention applied thereto.

Fig. 2 is a side elevation of a compressible septum or plug.

Fig. 3 is a combined section and edge view of the same.

Fig. 4 is a face view of a group of the compression members.

Fig. 5 is a section on the line V—V of Fig. 4.

Fig. 6 is a sectional view like Fig. 1 containing a modified form of the device.

Fig. 7 is a face view of the compressible member or septum shown in Fig. 6.

Referring first to Figs. 1 to 5 inclusive 8 designates a fraction of the conduit at its end, said conduit being of the usual material and as it appears terminating at the inner side of the wall of the cellar of a building. 9 designates the usual cables containing the electrical conductors. 10 designates the septum or plug which in the present invention is composed of a single piece of compressible or other resilient material, such for example, as rubber or a compound thereof adapted to serve as a packing to resist the pressure and passage of fluid.

In said views the septum is shown as of circular outline provided with three concavo-convex portions 11 equally spaced from each other and from the center of the septum. These concavo-convex portions are each provided with a central opening 12 for the reception of a cable and the rim of the septum is cut with a slit 13 extending to each of the cable receiving openings, said slit being preferably at an incline to the plane of the septum so that when pressure is applied to the septum the faces of the slit at each opening will be pressed against each other. The septum is also provided with bolt holes 14 for screw bolts 15 for applying pressure as hereinafter described.

16 designates the compression members, these being of sector-like form and each provided with arcuate recesses 17 in its straight edges so as to form, when properly assembled against the face of the septum, a circular-like opening to fit around the cables. Each compression sector is provided with a bolt hole 18 for the passage of the aforesaid bolt 15, the hole of the corresponding inner sector being threaded to receive the threaded end of the bolt.

In practice the septum will be made of a contour to easily slip into the conduit and the bolts partly threaded into the opposed sectors so that upon tightening up said bolts pressure is exerted to compress and flatten the protuberances of the concavo-convex portions of the septum. The effect of this operation is to press the body of the septum in all directions outward into close contact with the wall of the conduit and the rim of the hole of the protuberant portion into close contact with the cable in said protuberant portion.

The septum can be easily removed from the conduit by simply loosening the three bolts thereby relaxing the grip of the septum on the wall of the conduit.

Referring now to Figs. 6 and 7 I have shown how the principle of the invention can be used in a conduit of non-circular cross section or more particularly in substantially rectangular cross section. In Fig. 7 the septum 19, which is of rectangular outline should be of material like that hereinbefore suggested, is provided with a number of nodules 20 preferably of concavo-convex form and with suitable holes located as desired for the passage of the cables and bolt holes, said cable holes being of approximately the diameters of the cables. The compression or metallic plate 21 can be made as units and with holes for receiving the bolts 22. In Fig. 6 the parts are shown as they appear just before applying pressure. Upon applying pressure to the septum by turning up the bolts the effect is to flatten the nodules somewhat and expand the septum into close contact with the wall of the rectangular conduit and contract the inner parts of the septum at the cable holes into close contact with the cables and therefore tightly close the conduit and prevent the passage of gases or fluids.

The compressible members shown in Figs. 6 and 7 can be economically made by cutting them out of sheets of rubber.

The forms of the parts can be changed without departing from the gist of the invention as claimed.

What I claim is:

1. Means for plugging a conduit for an electrical or other conductor including in combination a compressible septum, said septum having concavo-convex portions each provided with an orifice for the passage of a conductor, and means compressing said concavo-convex portions and causing the rim of the septum to engage the wall of the conduit.

2. Means for plugging a conduit for an electrical or other conductor including in combination a compressible septum, said septum having concavo-convex portions each provided with a central orifice for a passage of the conductor, and means compressing said concavo-convex portions and causing the rim of the septum to engage the wall of the conduit.

3. Means for plugging a conduit for an electrical or other conductor including in combination a compressible septum to engage the wall of the conduit said septum having a flat face with a concavo-convex portion perforated for the passage of the conductor and means applying pressure to said portion expanding the rim of the septum into close engagement with the wall of the conduit and contracting the concavo-convex portion into close engagement with the conductor.

4. Means for plugging a conduit for an electrical or other conductor including in combination a compressible septum to engage the wall of the conduit, said septum having a nodule projecting from its face, and means applying pressure to said nodule causing an expansion of the rim of the septum into close contact with the wall of the conduit.

5. Means for plugging a conduit for an electrical or other conductor including in combination a compressible septum to engage the wall of the conduit, said septum having a plurality of nodules projecting from its face, and means applying pressure to said nodules causing an expansion of the rim of the septum into close contact with the wall of the conduit.

ORR H. WILLIAMS.